United States Patent
Kang et al.

(10) Patent No.: US 10,965,485 B2
(45) Date of Patent: Mar. 30, 2021

(54) AGENT ANALYSIS SYSTEM, DEVICE AND METHOD

(71) Applicant: Dartpoint Tech. Co., Ltd., Taipei (TW)

(72) Inventors: Chi-Lin Kang, New Taipei (TW); Chao-Yuan Huang, Taipei (TW)

(73) Assignee: DARTPOINT TECH. CO., LTD., Taipei (TW)

( * ) Notice: Subject to any disclaimer, the term of this patent is extended or adjusted under 35 U.S.C. 154(b) by 330 days.

(21) Appl. No.: 16/051,580

(22) Filed: Aug. 1, 2018

(65) Prior Publication Data
US 2019/0038503 A1   Feb. 7, 2019

Related U.S. Application Data

(60) Provisional application No. 62/540,611, filed on Aug. 3, 2017.

(51) Int. Cl.
| | |
|---|---|
| *H04L 12/08* | (2006.01) |
| *H04L 12/28* | (2006.01) |
| *H04L 29/08* | (2006.01) |
| *G06Q 30/02* | (2012.01) |
| *H04L 29/06* | (2006.01) |
| *H04W 12/06* | (2021.01) |
| *G01R 19/00* | (2006.01) |
| *G01R 19/25* | (2006.01) |
| *A61H 33/02* | (2006.01) |
| *E04H 4/12* | (2006.01) |
| *H04W 12/02* | (2009.01) |

(Continued)

(52) U.S. Cl.
CPC ........ *H04L 12/282* (2013.01); *G01R 19/0069* (2013.01); *G01R 19/2513* (2013.01); *G06Q 30/0284* (2013.01); *H04L 63/108* (2013.01); *H04L 67/12* (2013.01); *H04L 67/125* (2013.01); *H04W 12/06* (2013.01); *A61H 33/005* (2013.01); *A61H 33/0087* (2013.01); *A61H 33/028* (2013.01); *A61H 2033/0054* (2013.01); *A61H 2201/501* (2013.01); *A61H 2201/502* (2013.01); *E04H 4/129* (2013.01); *G06Q 20/308* (2020.05); *H04L 63/0428* (2013.01); *H04W 12/02* (2013.01)

(58) Field of Classification Search
None
See application file for complete search history.

(56) References Cited

U.S. PATENT DOCUMENTS 9,020,769 B2 *  4/2015  Rada ........................ G01D 4/00
                                                                702/60
9,781,151 B1 * 10/2017  McCorkendale ... H04L 63/1408
(Continued)

*Primary Examiner* — Paul D Lee
(74) *Attorney, Agent, or Firm* — Bacon & Thomas, PLLC

(57) ABSTRACT

An agent analysis system includes a terminal product system, a remote diagnosis system (RDS), and an agent analyzer. The terminal product system is supplied with a power source and provided with a current sensor to sense the power source. The RDS is used to transmit at least one control instruction via internet for the terminal product system. They agent analyzer is used to communicate with the terminal product system and the RDS, and configured to measure and analyze the electricity use characteristics of the terminal product system to be transmitted to the RDS; and receive and convert the control instruction from the RDS via internet for the terminal product system.

11 Claims, 13 Drawing Sheets

(51) Int. Cl.
  *G06Q 20/30* (2012.01)
  *A61H 33/00* (2006.01)

(56) References Cited

U.S. PATENT DOCUMENTS

| | | | |
|---|---|---|---|
| 2010/0191487 A1* | 7/2010 | Rada .................. | G01D 4/004 702/60 |
| 2011/0202196 A1* | 8/2011 | Venkatakrishnan ... | G06Q 50/06 700/295 |
| 2011/0251807 A1* | 10/2011 | Rada .................. | G01D 4/00 702/61 |
| 2012/0101653 A1* | 4/2012 | Tran .................. | G01D 4/004 700/296 |

\* cited by examiner

| Electricity use characteristics category items | Basic electricity use characteristics | | Heater (resistive) | Motor 1 (inductive) | Motor 2 (inductive) | Power frequency |
|---|---|---|---|---|---|---|
| | Product controller | Circulation motor | | | | |
| Common electricity use characteristics | V | | | | | 50/60 |
| | V | V | | | | 50/60 |
| | V | V | V | | | 50/60 |
| Single motor electricity use characteristics | V | V | | V | | 50/60 |
| | V | V | | | V | 50/60 |
| Complex electricity use characteristics | V | V | V | V | | 50/60 |
| | V | V | V | | V | 50/60 |
| | V | V | V | V | V | 50/60 |
| | V | V | | V | V | 50/60 |

V means existence of a characteristic value with actual value based on design.

FIG. 3

- Specific operation to activate electricity use analysis process
  (Example of motor 1-ON)

- Continuous monitor and analysis procedure
  (Example of heater-OFF)
  (Check if heater-on current appears in heater-OFF condition)

AGENT ANALYSIS SYSTEM, DEVICE AND METHOD

CROSS REFERENCE TO RELATED APPLICATION

This application claims the benefit of filing date of U.S. Provisional Application No. 62/540,611, entitled "Cable/wireless networking device and system configuration having functions of control instruction conversion and proxy measure analysis, and configuration (and method) of terminal product service time management" filed Aug. 3, 2017 under 35 USC § 119(e)(1).

BACKGROUND OF THE INVENTION

1. Field of the Invention

The present invention relates to an agent analysis system, device, and method applicable to internet of thing.

2. Description of Related Art

The internet of thing (IoT) is the network of physical devices via wired or wireless communications. The realization of IoT makes it possible to search, control or manage vehicles, home appliances and other items by a central or remote computer.

FIG. 13 shows a prior art IoT system 900.

In the system 900, a server 910 may control a SPA system 920, conventionally, only to turn on/off it. The SPA system 920 may communicate with the server 910 by a networking device 930 through a wired or wireless network. As shown in FIG. 13, the SPA system 920 and the networking device 930 may be two separated devices. Alternatively, the SPA system 920 and the networking device 930 may form a single integrated device. Alternatively, the SPA system 920 and the networking device 930 may further be combined with a smart panel 940, and in this case, the smart panel 940 serves as a master controller.

Moreover, the server 910 and the SPA system 920 may communicate with a mobile device 950, for example, a cell phone of a user. The user may use a mobile application (APP) in his mobile device to control the server 910 or the SPA system 920.

FIG. 14 shows a prior art Wi-Fi box 930' serving as the networking device 920 of FIG. 13.

The Wi-Fi box 930' is only used for internet connection, and it can only handle simple bidirectional communication between the server 910 and the SPA system 920. In particular, it transfers an instruction via the internet from the server 910 to the SPA system 920, and transfers a response from the SPA system 920 via the internet to the server 910. It does not have additional functions to monitor the parameters of the SPA system 920.

Therefore, in realization of a complete IoT system, it is desirable to design an improved system, device and method regarding the networking device to provide further convenient usage.

SUMMARY OF THE INVENTION

The present invention aims to realize an agent analyzer, which is capable of control instruction conversion and current measurement and analysis. The agent analyzer may be realized in form of a wired or wireless networking device. In addition to providing communication via a wired or wireless network, the agent analyzer is further designed to intercept (buffer) various remote control instructions (from a remote diagnosis system, for example), and convert them into extended control instructions compatible for different models of apparatuses (terminal product systems). In this way, the remote diagnosis system may control the apparatus by various control instruction to perform operation, diagnosis, maintenance or other application on the apparatuses.

According to a first aspect, the present invention provides an agent analysis system including a terminal product system, a remote diagnosis system (RDS), and an agent analyzer. The terminal product system is supplied with a power source and provided with a current sensor to sense the power source. The RDS is used to transmit at least one control instruction via internet for the terminal product system. The agent analyzer is used to communicate with the terminal product system and the RDS, and configured to measure and analyze electricity use characteristics of the terminal product system to be transmitted to the RDS, and receive and convert the control instruction from the RDS via internet for the terminal product system.

According to a second aspect, the present invention provides an agent analyzer including an instruction buffer, a data list set, an extended control generator and an instruction transmitter. The instruction buffer is used to receive a control instruction via a wireless or wired communication module and temporarily store the control instruction. The data list set includes data lists. The extended control generator is connected to a terminal product system, the instruction buffer and the data list set. The extended control generator includes an extended control process module and an electricity use characteristics analysis module, and configured to generate at least one extended control instruction based on at least one electricity use characteristic of the terminal product system, at least one control instruction from the instruction buffer and data in the data list set. The instruction transmitter is connected to the extended control generator, and used to transmit the extended control instruction from the extended control generator to the terminal product system.

According to a third aspect, the present invention provides an agent analysis method suitable to executed by an agent analyzer. The agent analyzer includes an instruction buffer, a data list set, an extended control generator, and an instruction transmitter. The instruction buffer is used to receive and temporarily store a control instruction. The data list set includes data lists. The extended control generator is connected to a terminal product system, the instruction buffer and the data list set. The instruction transmitter is connected to the extended control generator, and used to transmit an extended control instruction from the extended control generator to the terminal product system. The method includes following steps. A step S1 is performing to regularly monitor and analyze the terminal product system. A step S2 is receiving the control instruction via a wireless/wired communication module and temporarily storing the control instruction from a remote diagnosis system (RDS), a customer management system (CMS) or a mobile application (APP). A step S3 is starting an electricity use analysis with the extended control generator if the control instruction requests to turn on/off a load, or activate a specific operation; the electricity use analysis including a pre-analysis before a load action and a post-analysis after the load action. A step S4 is reading out the control instruction in the instruction buffer, activating a current operation mode of the terminal product system according to the control instruction, and performing the electricity use analysis during the current operation mode, after other functional operation(s) of the agent analyzer. A step S5 is performing an electricity use characteristics measurement to measure electricity use characteristics of the load of the terminal product system. A step S6 is comparing the electricity use characteristics of the load with data lists stored in the data list set by a continuous monitor and analysis procedure including the post-analysis for the load or a heater-OFF analysis.

Other objects, advantages, and novel features of the invention will become more apparent from the following detailed description when taken in conjunction with the accompanying drawings.

BRIEF DESCRIPTION OF THE DRAWINGS

FIG. 3 shows the electricity use characteristics category item list according to the present invention;

DETAILED DESCRIPTION OF THE PREFERRED EMBODIMENT

[Agent Analysis System]

Figure 1:
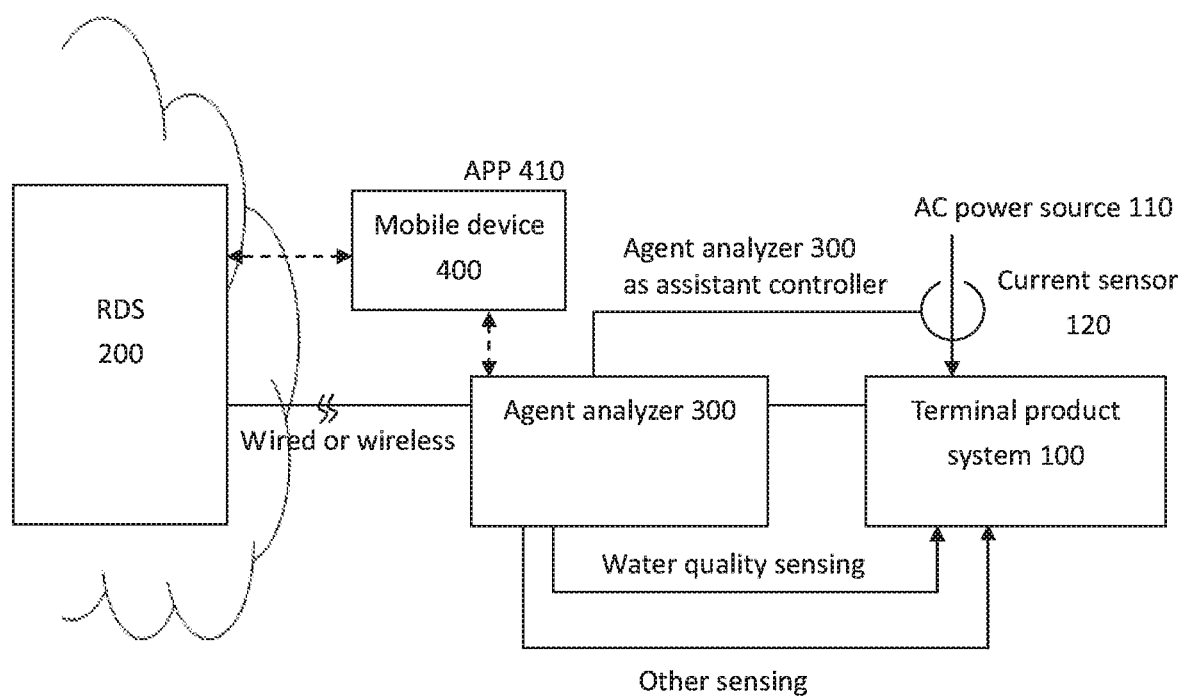
FIG. 1 shows a block diagram of the agent analysis system according to the present invention.

FIG. 1 shows a block diagram of the agent analysis system 1 according to the present invention.

The agent analysis system 1 includes a terminal product system 100, a remote diagnosis system (RDS) 200, and an agent analyzer 300.

Optionally, the agent analyzer 300 may be a Wi-Fi box.

The terminal product system 100 is supplied with a power source 110 and provided with a current sensor 120 to sense the power source 110.

Optionally, the terminal product system 100 may be a SPA system, a pool system, or a bath system.

Optionally, the power source may be an AC power source, particularly, with an AC frequency of 50 Hz or 60 Hz.

Optionally, the current sensor 30 may be clamped on, or in series with the power line between the terminal product system 100 and the power source 110.

The RDS 200 is used to transmit at least one control instruction via internet for the terminal product system 100.

The agent analyzer 300 is used to communicate with the terminal product system 100 and the RDS 200, and configured to measure and analyze electricity use characteristics of the terminal product system 100 to be transmitted to the RDS 200, and receive and convert the control instruction from the RDS 200 via internet for the terminal product system 100.

The electricity use characteristics may include a current, a voltage, a frequency, a resistance, a capacitance, and/or an inductance.

Optionally, the agent analysis system 1 may further include a mobile device 400 with a mobile application (APP) 410 used to communicate with the terminal product system 100 and the RDS 200, and used to transmit at least one control instruction via internet or wireless direct connection for the terminal product system 100.

Optionally, the agent analyzer 300 may further be configured to measure and analyze water quality of the terminal product system 100.

The operation method of the agent analysis system 1 will be discussed in the following description.

[Agent Analyzer]

Figure 2:
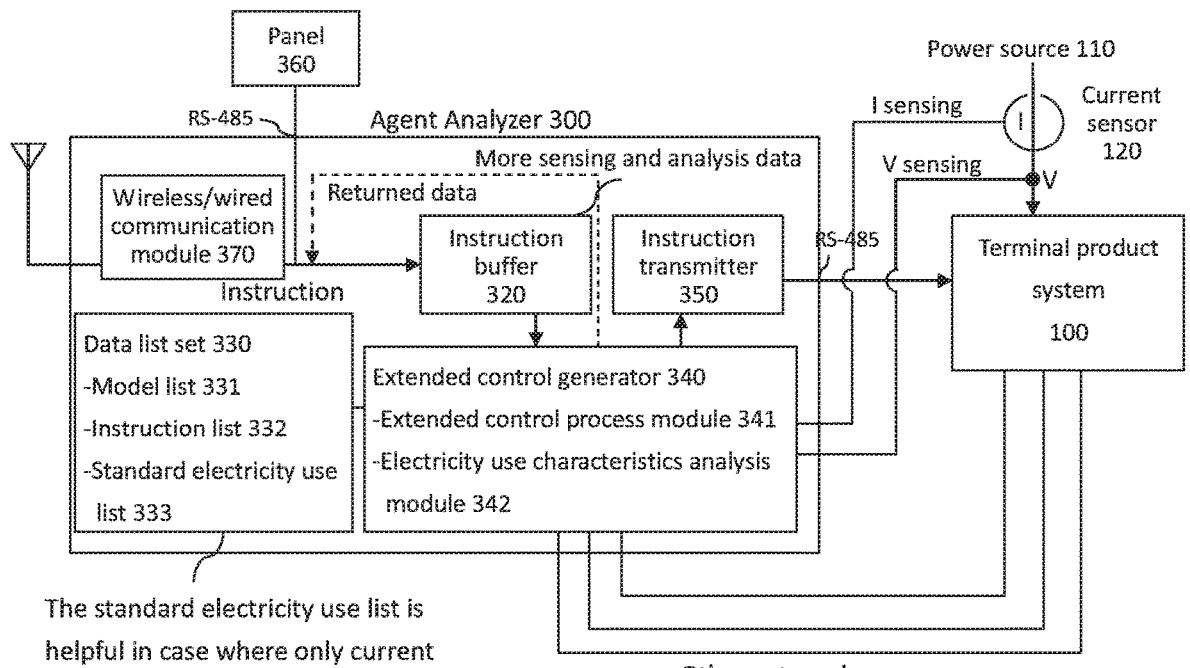
FIG. 2 shows a block diagram of the agent analyzer according to the present invention.

FIG. 2 shows a block diagram of the agent analyzer 300 according to the present invention.

The agent analyzer 300 includes an instruction buffer 320, a data list set 330, an extended control generator 340, and an instruction transmitter 350.

The instruction buffer 320 is used to receive a control instruction via a wireless or wired communication module and temporarily store the control instruction.

The data list set 330 includes data lists.

Preferably, the data list set 330 includes a model list 331, an instruction list 332, and a standard electricity use list 333. The standard electricity use list includes weighted basic electricity use data.

The extended control generator 340 is connected to a terminal product system 100, the instruction buffer 320, and the data list set 330. The extended control generator 340 includes an extended control process module 341 and an electricity use characteristics analysis module 342, and configured to generate at least one extended control instruction based on at least one electricity use characteristic of the terminal product system 100, at least one control instruction from the instruction buffer 320 and data in the data list set 330.

Preferably, the terminal product system 100 may be supplied with a power source 110 and provided with a current sensor 120 to sense the power source 110. The extended control generator 340 may be connected to the current sensor 120 to measure and analyze a current. The extended control generator 340 may be connected to a power source node V of the terminal product system 100 to measure and analyze a voltage (by a voltage divider, for example).

The instruction transmitter 350 is connected to the extended control generator 340, and used to transmit the extended control instruction from the extended control generator 340 to the terminal product system 100.

Preferably, the agent analyzer 300 may further include a panel 360 used to enter the control instruction locally.

According to the present invention, there are three features to be explained:

(1) Agent Analyzer

After receiving a control instruction (from the RDS, for example), the agent analyzer 300 will buffer the control instruction by the instruction buffer 320. After such buffering, the agent analyzer 300 will perform the extended control process and the electricity use characteristic analysis. The extended control process is used to analyze the control instruction, and determine whether to send the control instruction to the terminal product system 100 to complete an operation of the terminal product system 100. Furthermore, the extended control process will also generate (or update) the standard electricity use list 333.

According to the present invention, it is a key point about how to design the extended control process and the electricity use characteristic analysis process, especially when there is only a current sensor 120.

The electricity use characteristic analysis is used to determine a (normal or abnormal) condition of a high electricity using (power consuming) load, such as a heater, a lamp, or a pump in the terminal product system 100.

(2) Extended Control Process

The extended control process is used to detect a load (a motor, for example) in action of the terminal product system 100, determine its (normal or abnormal) condition, and generate (record) its electricity use characteristics (in the data list set 330). The electricity use characteristic may be obtained from harmonic components, measured in time differences, with reference to the model list 331, the instruction list 332, and the standard electricity use list 333.

Regarding utilization of the data list set 330 and basic electricity use characteristics, the data list set 330 includes the model list 331, the instruction list 332, and the standard electricity use list 333. The model list 300 stores data of various models of terminal product systems 100. The instruction list 332 stores instructions for controlling the respective load(s) of the terminal product system 100, and each of the instructions corresponds to electricity use characteristics of the respective loads. The standard electricity use list 333 is constructed by the basic electricity use characteristics (preferably based on a power source of 110V). With the electricity use characteristics analysis obtained by the extended control process, the (normal) electricity use characteristics of a heater, a lamp, and/or a pump action may be derived by weighting the (normal) data stored in the standard electricity use list 333.

(3) Method of Electricity Use Characteristics Analysis

The electricity use characteristics analysis may involve synchronously sampling the current in the electricity use, using fast Fourier transform (FFT) to obtain at least previous non-zero eight harmonic components, and calculating a root mean square (RMS) value of the current.

In order to implement the aforementioned three features, the agent analyzer 300 is designed to insert an additional time period after receiving the control instruction. The extended control generator 340 performs the extended control process via the extended control process module 341 and the electricity use characteristics analysis via the electricity use characteristics analysis module 342 to generate an extended control instruction. The instruction transmitter 350 transmits the extended control instruction to the terminal product system 100. The additional time period exists between receipt of the control instruction and transmission of the extended control instruction.

Preferably, the extended control generator 340 may perform the electricity use characteristics analysis to determine whether there is a malfunction of a load or a relay of the load of the terminal product system.

Preferably, the extended control generator 340 may have a measurement function for measuring the electricity use or consumption of at least one load in the terminal product system 100, the measurement function using (fast) Fourier transform to obtain current values of at least eight non-zero harmonic components, and then calculate RMS value of the at least eight values, which is the amount of electricity consumption.

Figure 2A:
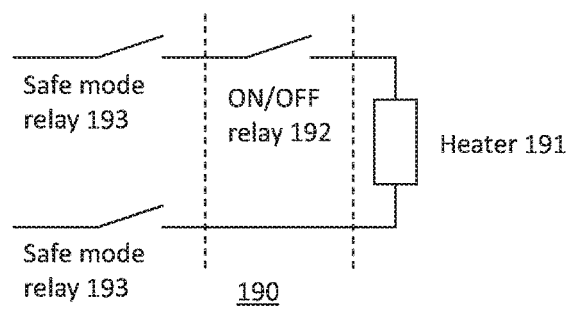
FIG. 2A shows a heater circuit of the terminal product system according to the present invention.

FIG. 2A shows a heater circuit 190 of the terminal product system 100 according to the present invention.

The heater circuit 190 is set in the terminal product system 100 includes a heater 191, an ON/OFF relay 192, and at least one safe mode relay 193 (two safe mode relays shown in FIG. 2A).

The heater 191 is connected to a power source (not shown). The ON/OFF relay 192 is in series with the heater 191 to turn on/off the heater 191. The safe mode relay(s) 193 is also in series with the heater 191, and it can enter a safe mode of heater's relay operation to turn off the heater when the heater 191 is abnormal after analysis done by agent analyzer 300.

[Characteristics Category Item List]

FIG. 3 shows the electricity use characteristics category item list according to the present invention.

The data list set 330 (realized in form of the electricity use characteristics category item list) includes common electricity use characteristics, single load electricity use characteristics and/or complex electricity use characteristics with respect to a product controller, a circulation motor, a heater, a first motor ("motor 1" in the drawings), and/or a second motor ("motor 2" in the drawings) of the terminal product system 100.

The heater may be resistive. The first motor and the second motor may be inductive.

Specifically, the product controller and the circulation motor are basic loads for most of the terminal product system 100, such as a SPA system, a pool system, or a bath system, so a column "basic electricity use characteristics" in FIG. 3 is designed for the product controller and the circulation motor.

The column "common electricity use characteristics" refers to the electricity use characteristics of the product controller, the circulation motor, and the heater.

The column "single load electricity use characteristics" refers to the electricity use characteristics of only one motor, either the first motor or the second motor, in combination with the product controller and the circulation motor.

The column "complex electricity use characteristics" refers to the electricity use characteristics of any two of the heater, a first motor, and/or the second motor, in combination with the product controller and the circulation motor. The heater, the first motor, and the second motor are each so-called a high electricity using (power consuming) load.

It is to be understood that the aforementioned loads are examples, and other loads may replace the aforementioned loads in other applications.

In FIG. 3, a mark "V" in a column means that a characteristic value is stored in the column. However, actual characteristic values are based on design parameters of the terminal product systems 100 in practical applications.

Particularly, the single load electricity use characteristics and the complex electricity use characteristics are derived by comparing a measured total present electricity use (power) of the terminal product system 100 with the basic electricity use characteristics.

In other words, the basic electricity use characteristics may be basic reference values. The electricity use characteristics of other loads may be traced and compared with them, especially when the terminal product system 100 is equipped only with a current sensor 120 rather than a voltage sensor.

There is a special feature in the basic electricity use characteristics analysis. When there is no sensed voltage (because there is no voltage sensor), the external voltage applied to the terminal product system 100 may be estimated by a ratio of the basic electricity use characteristics. The external voltage is proportional to the current within a specific range (±15% of the external voltage, or particularly, 200V-240V). If the current is too high/low, it also means that the external voltage is correspondingly higher/lower than a normal range. In this case, the load(s) of the terminal product system 100 should be turned off.

When we intend to derive load(s) electricity use characteristics during the load(s) of the terminal product system 100 is turned on, we may check the currently or regularly sensed values of the basic electricity use characteristics as the basic reference values, and then derive the load(s) electricity use characteristics by weighting the basic reference values. The weighted basic reference values are regarded as baselines to determine whether the load(s) is normal or not. For example, when the external voltage is multiplied by a factor within an allowable voltage variation, the basic electricity use characteristics and a sensed motor's electricity use characteristics will also be multiplied by the factor. However, when compared with a preset normal range, the electricity use characteristics should be divided by the factor, so that the electricity use characteristics and the normal range can be compared with each other in a consistent way. The normal range may be defined to be within ±10% (symmetrically), +15%/−10% (asymmetrically), or xx.xA-yy.yA (given range values) of the weighted basic reference value.

[Main Procedure]

Figure 4:
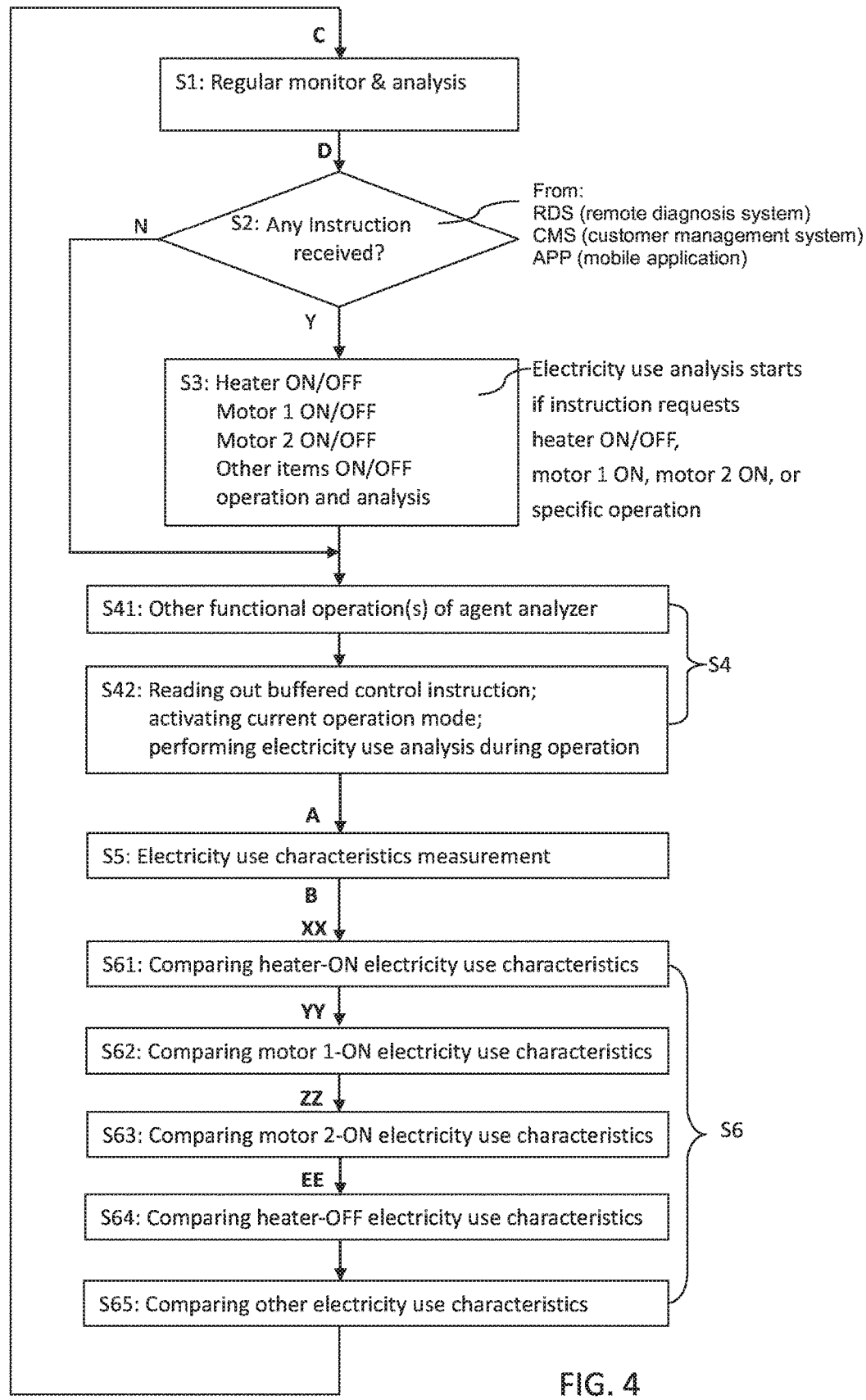
FIG. 4 shows a flowchart of the main procedure of the agent analyzer according to the present invention.

FIG. 4 shows a flowchart of the main procedure of the agent analyzer according to the present invention.

An agent analysis method is suitable to be executed by an agent analyzer 300 as previously discussed. The method (main procedure) includes following steps:

Step S1 is regularly monitoring and analyzing the terminal product system 100.

The step S1 is also called "regular monitor and analysis procedure" and will be discussed in detailed later.

Step S2 is receiving a control instruction via a wireless/wired communication module and temporarily storing the control instruction from a remote diagnosis system (RDS), a customer management system (CMS) or a mobile application (APP).

Step S3 is starting an electricity use analysis with the extended control generator 340 if the control instruction requests to turn on/off a load, or activate a specific operation; the electricity use analysis including a pre-analysis before a load action and a post-analysis after the load action.

The step S3 is also called "specific operation to activate electricity use analysis process", each load has its own electricity use analysis process, and some examples will be discussed in detailed later. Some electricity use analysis processes may be divided into the pre-analysis, which is performed before the load action, and the post-analysis, which is performed after the load action, because the conditions of the load before and after action are both important, and should be confirmed.

Step S4 is reading out the control instruction in the instruction buffer 320, activating a current operation mode of the terminal product system 100 according to the control instruction, and performing the electricity use analysis during the current operation mode, after other functional operation(s) of the agent analyzer 300.

The step S4 is used to restore the current operation mode if there is another operation breaking or interfering with the current operation.

Step S5 is performing an electricity use characteristics measurement to measure electricity use characteristics of the load of the terminal product system 100.

The step S5 is also called "electricity use characteristics measurement process" and will be discussed in detailed later. The step S5 is a common step available for other steps, such as the step S3 and the step S6. Particularly, the step S3 and the step S6 may share the measured data in the step S5.

Step S6 is comparing the electricity use characteristics of the load with data lists stored in the data list set 330 by a continuous monitor and analysis procedure including the post-analysis for the load or a heater-OFF analysis.

The step S6 is also called "continuous monitor and analysis procedure" and will be discussed in detailed later. The step S6 is different from the step S3 because the step S3 is performed at the time when a control instruction is received, while, the step S6 is perform during the operation of the load(s). In other aspect, the step S3 is used to determine whether to execute the control instruction, while, the step S6 is used to check whether the load(s) are keeping working well.

[Electricity Use Characteristics Measurement Process]

Figure 5:
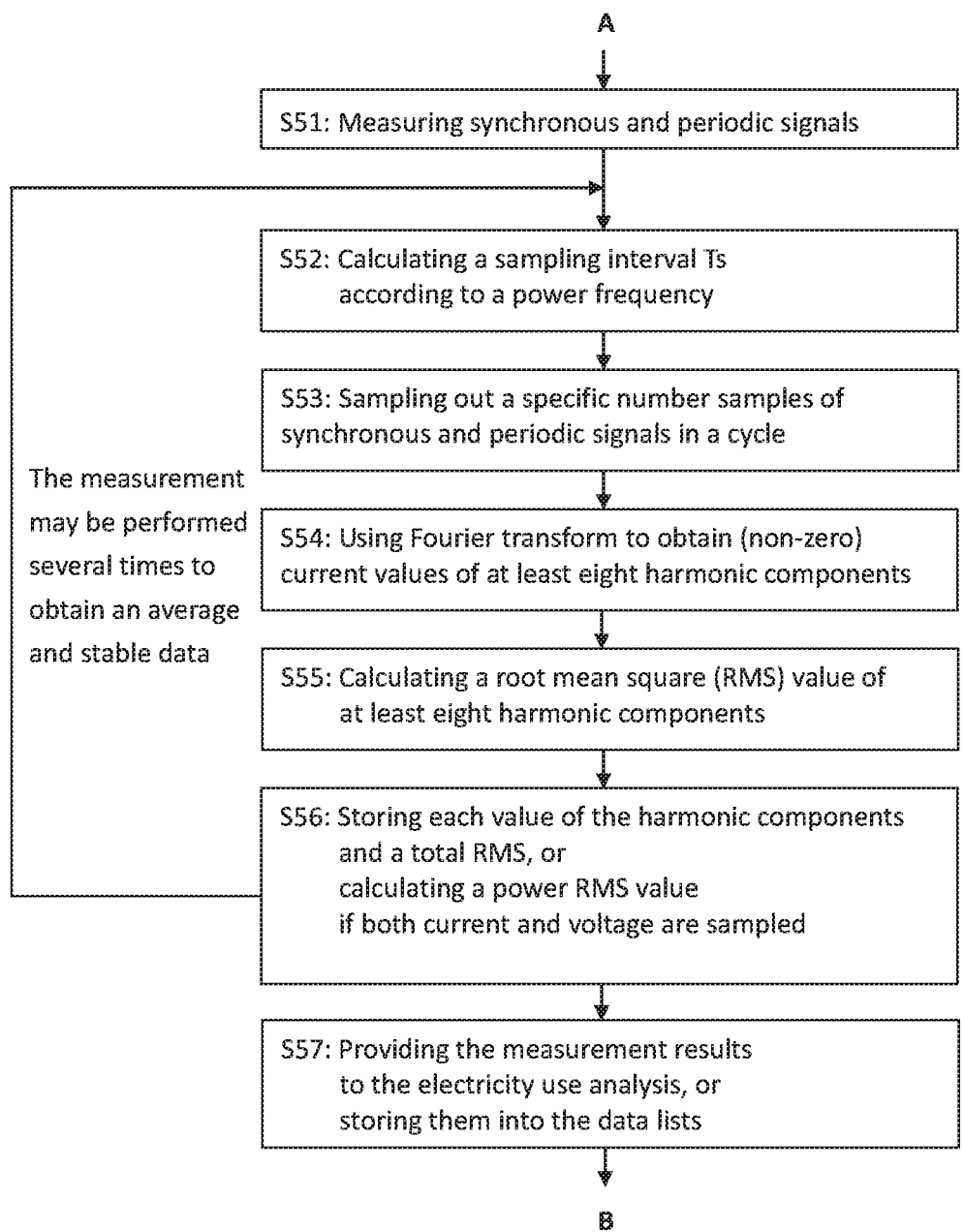
FIG. 5 shows a flowchart of the electricity use characteristics measurement process according to the present invention.

FIG. 5 shows a flowchart of the electricity use characteristics measurement process according to the present invention.

The Step S5 further includes following steps:

Step S51 is measuring synchronous and periodic signals of the electricity use characteristics. Herein, the synchronous and periodic signals may be current signals or voltage signals, and frequencies thereof may be 50 Hz or 60 Hz.

Step S52 is calculating a sampling interval Ts according to a power frequency.

Step S53 is sampling out a specific number samples from the synchronous and periodic signals in a cycle. Herein, the specific number of samples may be 256 samples.

Step S54 is using (fast) Fourier transform to obtain current values of at least eight non-zero harmonic components. The fast Fourier transform may be represented by $f_n$ with DC bias $f_0$ ($f_0$ is usually insignificant or non-existent).

Step S55 is calculating a root mean square (RMS) value of at least eight harmonic components.

Step S56 is storing each value of the harmonic components and a total RMS value, or calculating a power RMS value if the synchronous and periodic signals include both current signals and voltage signals.

Step S57 is providing the each value of the harmonic components, the total RMS value and/or the power RMS value to the electricity use analysis, and/or storing them into the data lists 331, 332, 333 in FIG. 2.

In some embodiments, the data lists 331, 332, 333 may be associated with the electricity use characteristics category item list in FIG. 3.

Preferably, the data lists 331, 332, 333 in FIG. 2 are built by basic electricity use characteristics setup steps and item electricity use characteristics setup steps. The basic electricity use characteristics are measured from a product controller and a circulation motor, and the item electricity use characteristics are measured from a first motor, and/or a second motor, and/or a heater. The setup steps are illustrated in FIG. 6 and will be discussed in the following description.

[Electricity Use Characteristics Setup]

Figure 6:
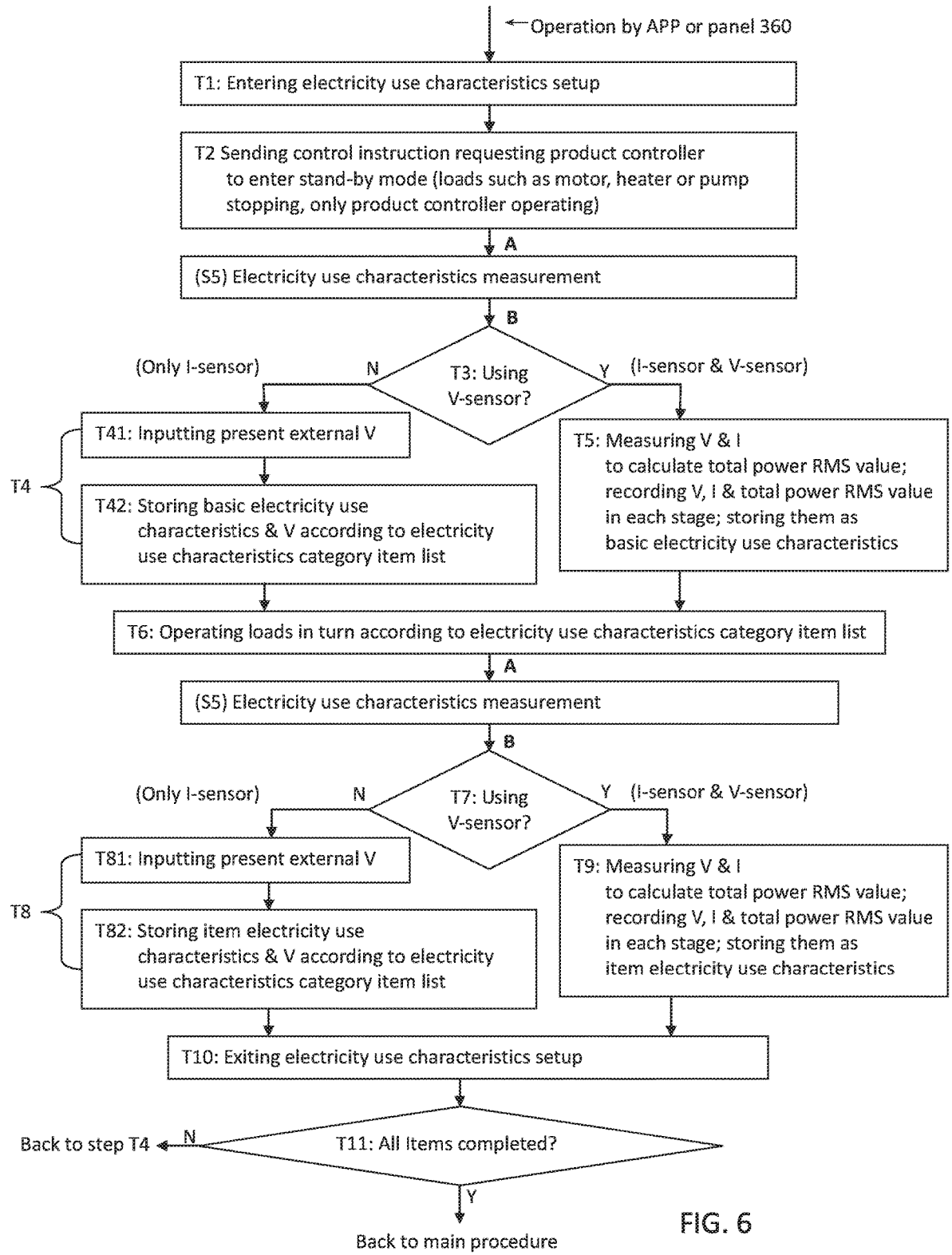
FIG. 6 shows a flowchart of the electricity use characteristics setup according to the present invention.

FIG. 6 shows a flowchart of the electricity use characteristics setup according to the present invention.

The electricity use characteristics setup is also regard as a learning process to update the data lists (in form of FIG. 3, for example), and it may be an additional process out of the aforementioned main procedure.

The basic electricity use characteristics analysis setup steps include following steps:

Step T2 is sending a control instruction requesting the product controller to enter a stand-by mode to stop the loads other than the product controller.

Step T3 is determining if any voltage sensor is used, after the electricity use characteristics measurement (the step S5).

Step T4 is inputting a present external voltage, and storing basic electricity use characteristics and the present external voltage according to an electricity use characteristics category item list, if only the current sensor exists.

Step T5 is measuring a voltage and a current to calculate a total power RMS value, recording value of the voltage, value of the current in each stage, and a total power RMS value, and storing them as basic electricity use characteristics, if both the voltage sensor and the current sensor exist.

Then, the item electricity use characteristics analysis setup steps include following steps:

Step T6 is operating loads (a heater, a first motor or a second motor) of the terminal product system 100 in turn according to an electricity use characteristics category item list.

Step T7 is determining if any voltage sensor is used, after the electricity use characteristics measurement (the step S5).

Step T8 is inputting a present external voltage, and storing item electricity use characteristics and the present external voltage according to an electricity use characteristics category item list, if only the current sensor exists.

Step T9 is measuring a voltage and a current to calculate a total power RMS value, recording value of the voltage, value of the current in each stage, and a total power RMS value, and storing them as item electricity use characteristics, if both the voltage sensor and the current sensor exist.

[Regular Monitor and Analysis Procedure]

Figure 7:
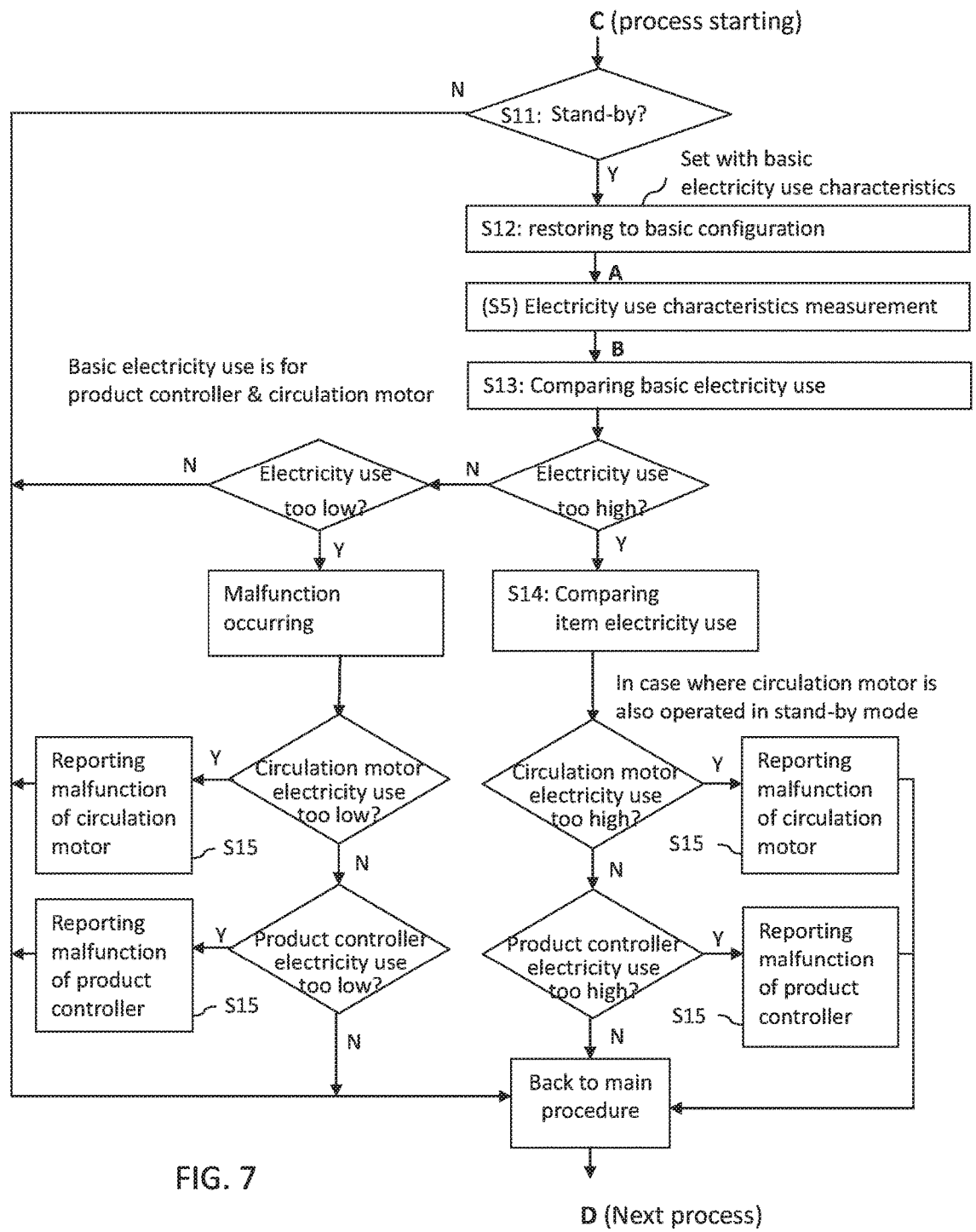
FIG. 7 shows a flowchart of the regular monitor and analysis procedure of terminal product system electricity use according to the present invention.

FIG. 7 shows a flowchart of the regular monitor and analysis procedure (e.g. the step S1 in FIG. 5) of terminal product system electricity use according to the present invention.

It is to be understood that this "regular" monitor and analysis procedure is introduced for the product controller and the circulation motor, which are basic loads of the terminal product system 100.

Specifically, the regular monitor and analysis procedure (e.g. the step S1 in FIG. 5) includes following steps:

Step S11 is determining if the terminal product system 100 is in a stand-by mode.

Step S12 is restoring a basic configuration by a corresponding control instruction.

Step S13 is comparing present basic electricity use with the data lists to determine if it is too low or too high, after the electricity use characteristics measurement (the step S5).

Step S14 is comparing present item electricity use with the data lists to determine either the product controller or the circulation motor has a higher electricity use.

Step S15 is reporting malfunction of the product controller and/or the circulation motor, if the product controller electricity use is too low or too high, or the circulation motor electricity use is too low or too high.

[Specific Operation to Activate Electricity Use Analysis Process (Example of Heater-ON)]

Figure 8:
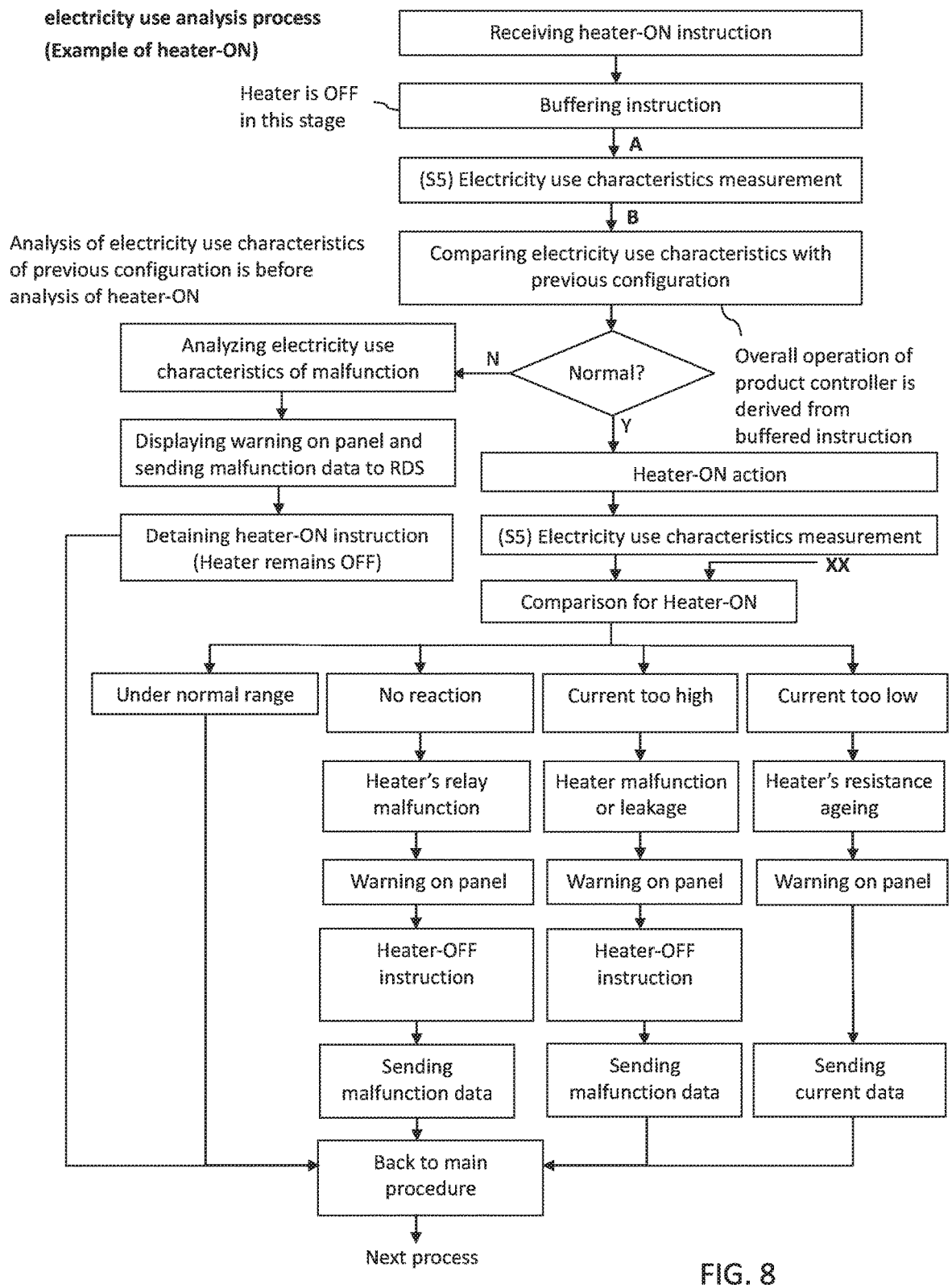
FIG. 8 shows a flowchart of the specific operation to activate electricity use analysis process (example of heater-ON) according to the present invention.

FIG. 8 shows a flowchart of the specific operation to activate electricity use analysis process (example of heater-ON) according to the present invention.

(Pre-Analysis)

When receiving a control instruction which requests to turn on a heater of the terminal product system 100, the agent analyzer 300 will buffer the control instruction at first, so that the heater will not be turned on immediately. The agent analyzer 300 will then check whether the heater is normal by checking its electricity use characteristics (commonly, its current characteristic). The agent analyzer 300 will transmit the control instruction to the terminal product system 100 only when it confirms that the heater is normal. This analysis is performed before the heater's action, so it is called "pre-analysis".

Accordingly, the electricity use analysis process for a specific operation of heater-ON with the pre-analysis includes following steps:

(i) receiving a heater-ON instruction;

(ii) buffering the heater-ON instruction by the extended control generator 340;

(iii) performing the electricity use characteristics measurement; and (iv) comparing measured electricity use characteristics of a heater of the terminal product system 100 with its previous configuration in the data lists to determine whether the heater is normal by the extended control generator 340.

According to the analyzed results, the agent analyzer 300 may take different actions, for example:

(v) analyzing electricity use characteristics of malfunction, displaying a warning on a panel, and sending malfunction data to the RDS, the CMS and/or the APP; and detaining the heater-ON instruction, if the electricity use characteristics of the heater is abnormal compared with the previous configuration by the extended control generator 340; or (vi) performing a heater-ON action sent by the instruction transmitter 350, and performing the electricity use characteristics measurement, if the electricity use characteristics of the heater is normal compared with the previous configuration by the extended control generator 340.

(Post-Analysis)

Even though the heater is normal before action, it is still necessary to check whether the heater remains normal after action.

If the electricity use characteristics of the heater show no current reaction during heater-ON action, it possibly means that there is an open circuit, possibly caused by the heater's relay malfunction. In this case, the heater should be turn off, a warning will be displayed on the panel 360, and malfunction data will be sent to the RDS.

Alternatively, if the electricity use characteristics of a heater show a too-high current, it possibly means that there is a short circuit, possibly caused by the heater malfunction or the heater leakage. In this case, the heater should be turned off, a warning will be displayed on the panel 360, and malfunction data will be sent to the RDS as well.

Alternatively, if the electricity use characteristics of a heater show a too-low current, it is possibly caused by the heater's resistance ageing. In this case, it may be not necessary to turn off the heater, but a warning will be displayed on the panel 360, and relevant data will be sent to the RDS.

The analysis is performed after the heater's action, so it is called "post-analysis". The post-analysis may be a common process for the continuous monitor and analysis procedure for heater-ON in step S61, so there is a label "XX" in FIG. 4 and FIG. 8, which means the continuous monitor and analysis procedure for heater-ON in step S61 in FIG. 4 may start from "XX" in FIG. 8.

Accordingly, the post-analysis includes following steps:

(i) comparing measured electricity use characteristics of the heater-ON action with the data lists;

(ii) displaying a warning on a panel, turning off the heater, and sending malfunction data to the RDS, the CMS and/or the APP, if it confirms (a) a heater's relay malfunction that results in no current reaction; or (b) a heater malfunction or a heater leakage that results in a too-high current; or (iii) displaying a warning on a panel, and sending currently obtained data to the RDS, the CMS and/or the APP if it confirms (c) a heater's resistance ageing that results in a too-low current.

[Specific Operation to Activate Electricity Use Analysis Process (Example of Heater-OFF)]

Figure 9:
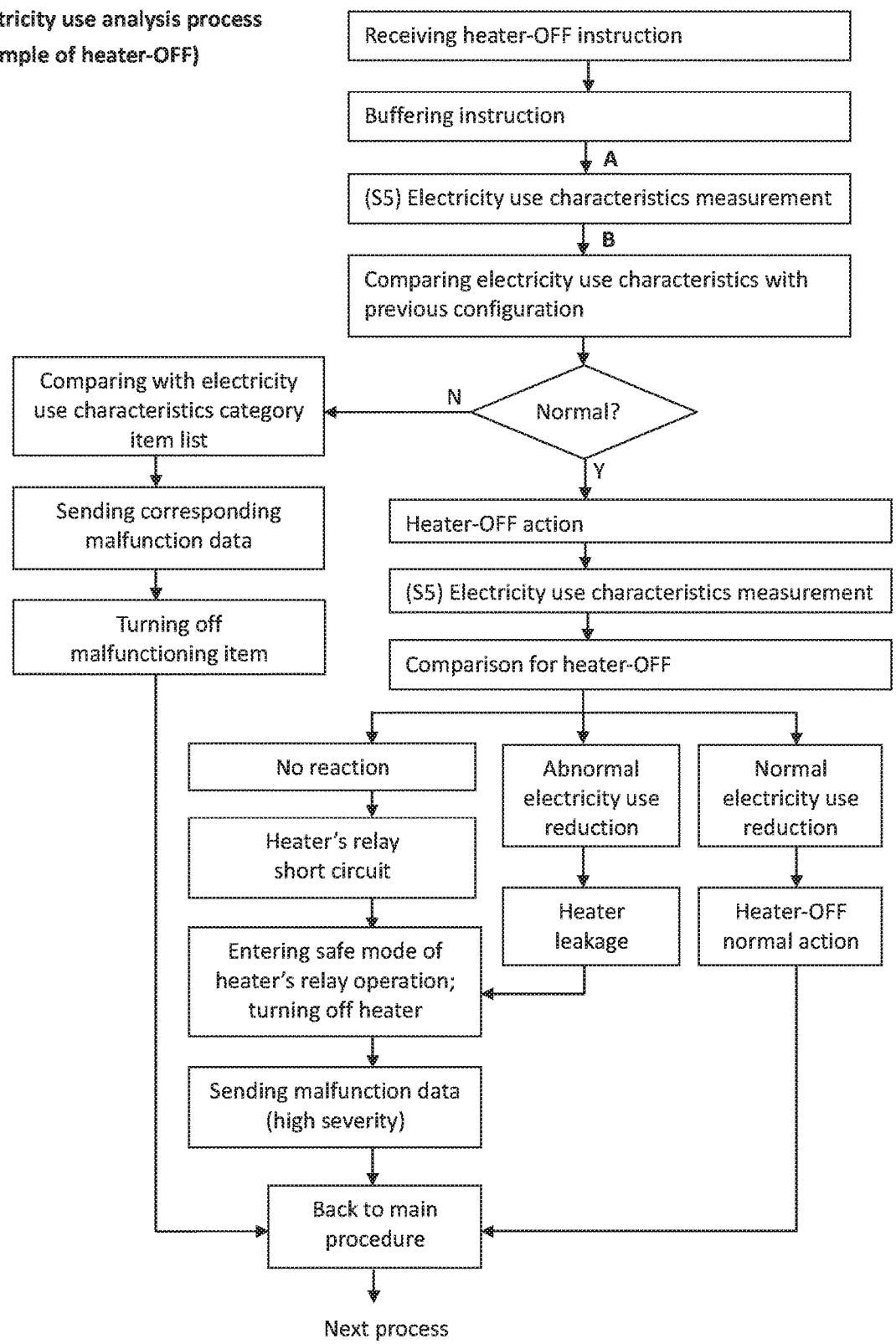
FIG. 9 shows a flowchart of the specific operation to activate electricity use analysis process (example of heater-OFF) according to the present invention.

FIG. 9 shows a flowchart of the specific operation to activate electricity use analysis process (example of heater-OFF) according to the present invention.

(Pre-Analysis)

When receiving a control instruction which requests to turn off a heater of the terminal product system 100, the agent analyzer 300 will buffer the control instruction at first, so that the heater will not be turned off immediately. A pre-analysis will be performed before a heater-OFF action.

Accordingly, the electricity use analysis process for a specific operation of heater-OFF with the pre-analysis includes following steps:

(i) receiving a heater-OFF instruction;

(ii) buffering the heater-OFF instruction by the extended control generator 340;

(iii) performing the electricity use characteristics measurement;

(iv) comparing measured electricity use characteristics of a heater of the terminal product system 100 with its previous configuration in the data lists to determine whether the heater is normal by the extended control generator 340.

According to analyzed results, the agent analyzer 300 may take different actions, for example:

(v) comparing measured electricity use characteristics of the heater with electricity use characteristics category item list to find malfunctioning item(s); sending corresponding malfunction data to the RDS, the CMS and/or the APP; and turning off the malfunctioning item(s), if the electricity use characteristics of the heater is abnormal compared with the previous configuration by the extended control generator 340; or (vi) performing a heater-OFF action sent by the instruction transmitter 350; and performing the electricity use characteristics measurement, if the electricity use characteristics of the heater is normal compared with the previous configuration by the extended control generator 340.

Even though the heater is normal before action, it is still necessary to check whether the heater remains normal after action.

If the electricity use characteristics of the heater show no reaction during heater-OFF operation, it is possibly caused by a short circuit of the heater's relay. Alternatively, if the electricity use characteristics of a heater show abnormal electricity use reduction (i.e. in abnormal range), it is possibly caused by the heater leakage. In these cases, the heater's relay will enter a safe mode (which may be implemented by the heater circuit shown in FIG. 2A), the heater will be turned off, and malfunction data will be sent to RDS, in case of high severity.

Alternatively, if the electricity use characteristics of a heater show normal electricity use reduction (i.e. in normal range), it means the heater is normally turned off.

Accordingly, the analysis further includes following steps:

(i) comparing measured electricity use characteristics of the heater-OFF action with the data lists by the extended control generator 340; and (ii) entering a safe mode of heater's relay operation, turning off the heater, and sending malfunction data to the RDS, the CMS and/or the APP, if it confirms (a) a heater's relay short circuit that results in no current reaction; or (b) a heater leakage that results in an abnormal electricity use reduction by the extended control generator 340.

[Specific Operation to Activate Electricity Use Analysis Process (Example of First Motor-ON)]

Figure 10:
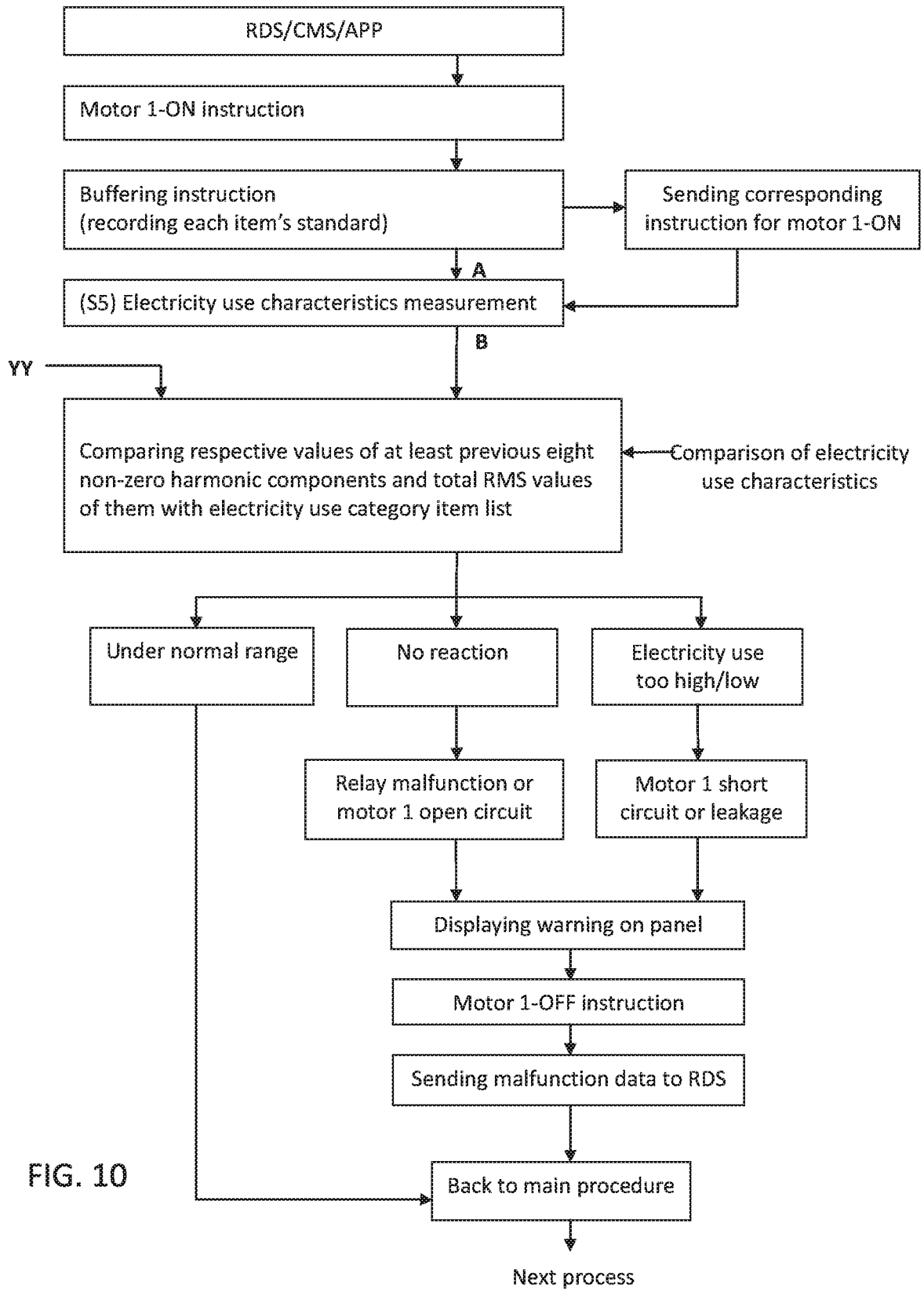
FIG. 10 shows a flowchart of the specific operation to activate electricity use analysis process (example of first motor-ON) according to the present invention.

FIG. 10 shows a flowchart of the specific operation to activate electricity use analysis process (example of first motor-ON) according to the present invention.

When receiving a control instruction which requests to turn on a first motor of the terminal product system 100, the agent analyzer 300 will buffer the control instruction at first, so that the first motor will not be turned on immediately. An analysis will be performed to determine whether to turn on the first motor or not. Even though the first motor is normal before action, it is still necessary to check whether the first motor remains normal after action.

If the electricity use characteristics of the first motor show no reaction during first motor-ON operation, it is possibly caused by an open circuit of a relay or the first motor. Alternatively, if the electricity use characteristics of the first motor are too high or too low, it is possibly caused by the first motor short circuit or the first motor leakage. In these cases, the first motor will be turned off, a warning will be displayed on a panel, and malfunction data will be sent to the RDS.

Accordingly, the electricity use analysis process for a specific operation of the first motor-ON includes following steps:

(i) receiving a first motor-ON instruction;

(ii) buffering the first motor-ON instruction;

(iii) sending corresponding instruction for the first motor-ON by the extended control generator 340;

(iv) performing the electricity use characteristics measurement;

(v) comparing respective values of at least previous eight non-zero harmonic components; and total RMS values of them with the electricity use characteristics category item list; and (vi) displaying a warning on a panel, performing a first motor-OFF instruction, and sending malfunction data to the RDS, the CMS and/or the APP, if it confirms (a) a relay malfunction or a first motor open circuit that results in no current reaction; or (b) a first motor short circuit or a first motor leakage that results in a too-high electricity use or a too-low electricity use.

The aforementioned steps (v)-(vi) may be a common process for the continuous monitor and analysis procedure for first motor-ON in step S62, so there is a label "YY" in FIG. 4 and FIG. 10, which means the continuous monitor and analysis procedure for first motor-ON in step S62 in FIG. 4 may start from "YY" in FIG. 10.

[Specific Operation to Activate Electricity Use Analysis Process (Example of Second Motor-ON)]

Figure 11:
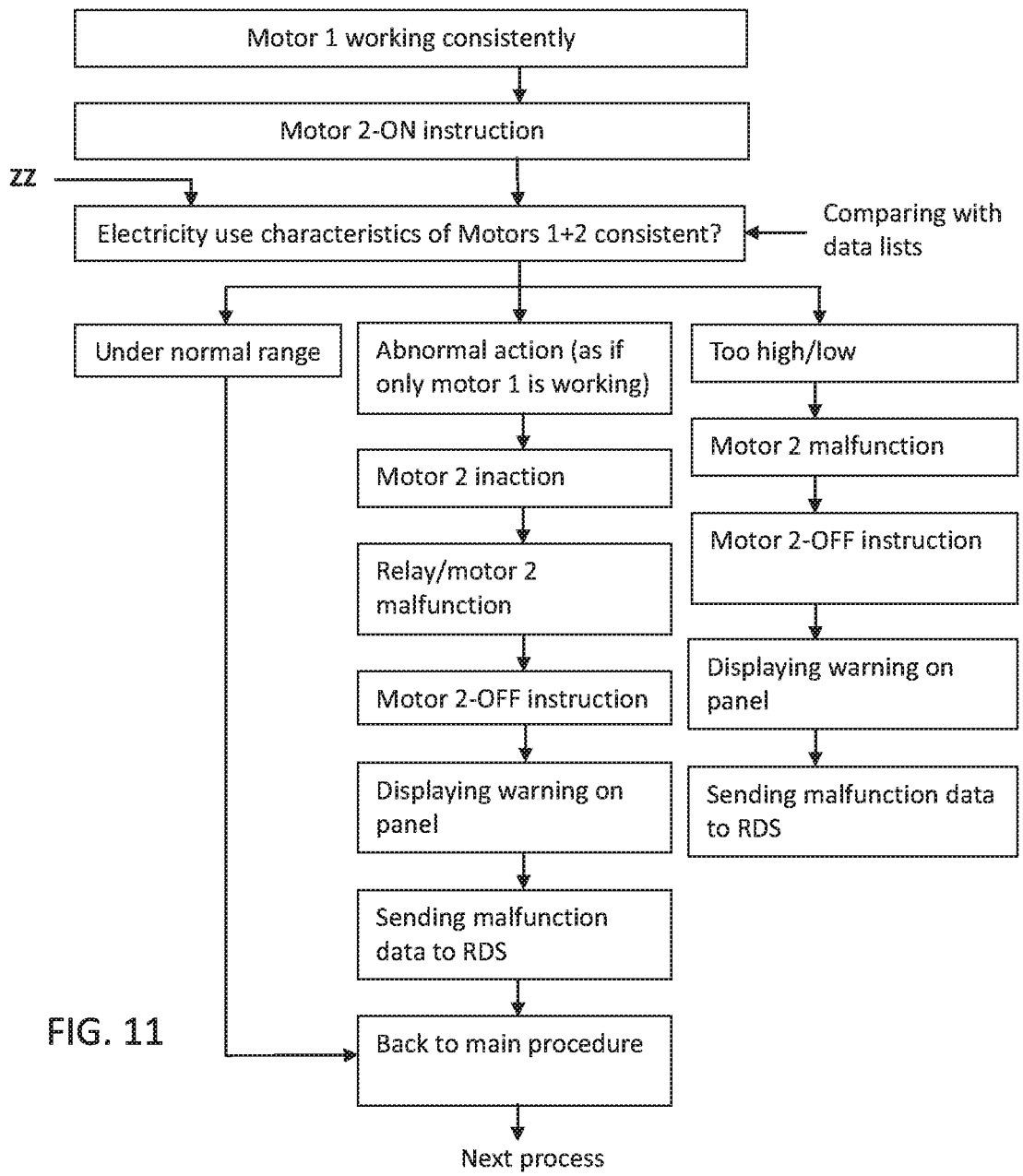
FIG. 11 shows a flowchart of the specific operation to activate electricity use analysis process (example of second motor-ON) according to the present invention.

FIG. 11 shows a flowchart of the specific operation to activate electricity use analysis process (example of second motor-ON) according to the present invention.

When receiving a control instruction which requests to turn on a second motor of the terminal product system 100, the agent analyzer 300 will buffer the control instruction at first, so that the second motor will not be turned on immediately. An analysis will be performed to determine whether to turn on the second motor or not. Even though the second motor is normal before action, it is still necessary to check whether the second motor remains normal after action.

Particularly, when the first motor has been working with consistent electricity use characteristics, the electricity use characteristics analysis for the first motor and the second motor (e.g. the first motor+the second motor) can start. It is required to confirm if the electricity use characteristics of the first motor and the second motor are consistent according to the data lists.

If the electricity use characteristics of the first motor and the second motor show abnormal action as if only the first motor is working, a relay malfunction or the second motor malfunction will be confirmed. Alternatively, if the electricity use characteristics of the first motor and the second motor are too high or too low, the second motor malfunction will be confirmed. In these cases, the second motor will perform no action (or be turned off), a warning will be displayed on a panel, and malfunction data will be sent to the RDS.

Accordingly, the electricity use analysis process for a specific operation of the second motor-ON when the first motor is working consistently includes following steps:

(i) receiving a second motor-ON instruction by the extended control generator 340;

(ii) determining whether the electricity use characteristics of the first motor and the second motor are consistent with the data lists; and (iii) performing a second motor-OFF instruction, displaying a warning on a panel, and sending malfunction data to the RDS, the CMS and/or the APP, if it confirms (a) a relay malfunction or a second motor malfunction that results in the second motor inaction wherein the electricity use characteristic appears that only the first motor is working; or (b) a second motor malfunction that results in a too-high electricity use or a too-low electricity use.

The aforementioned step (ii)-(iii) may be a common process for the continuous monitor and analysis procedure for second motor-ON in step S63, so there is a label "ZZ" in FIG. 4 and FIG. 11, which means the continuous monitor and analysis procedure for second motor-ON in step S63 in FIG. 4 may start from "ZZ" in FIG. 11.

[Continuous Monitor and Analysis Procedure (Example of Heater-OFF)]

Figure 12:
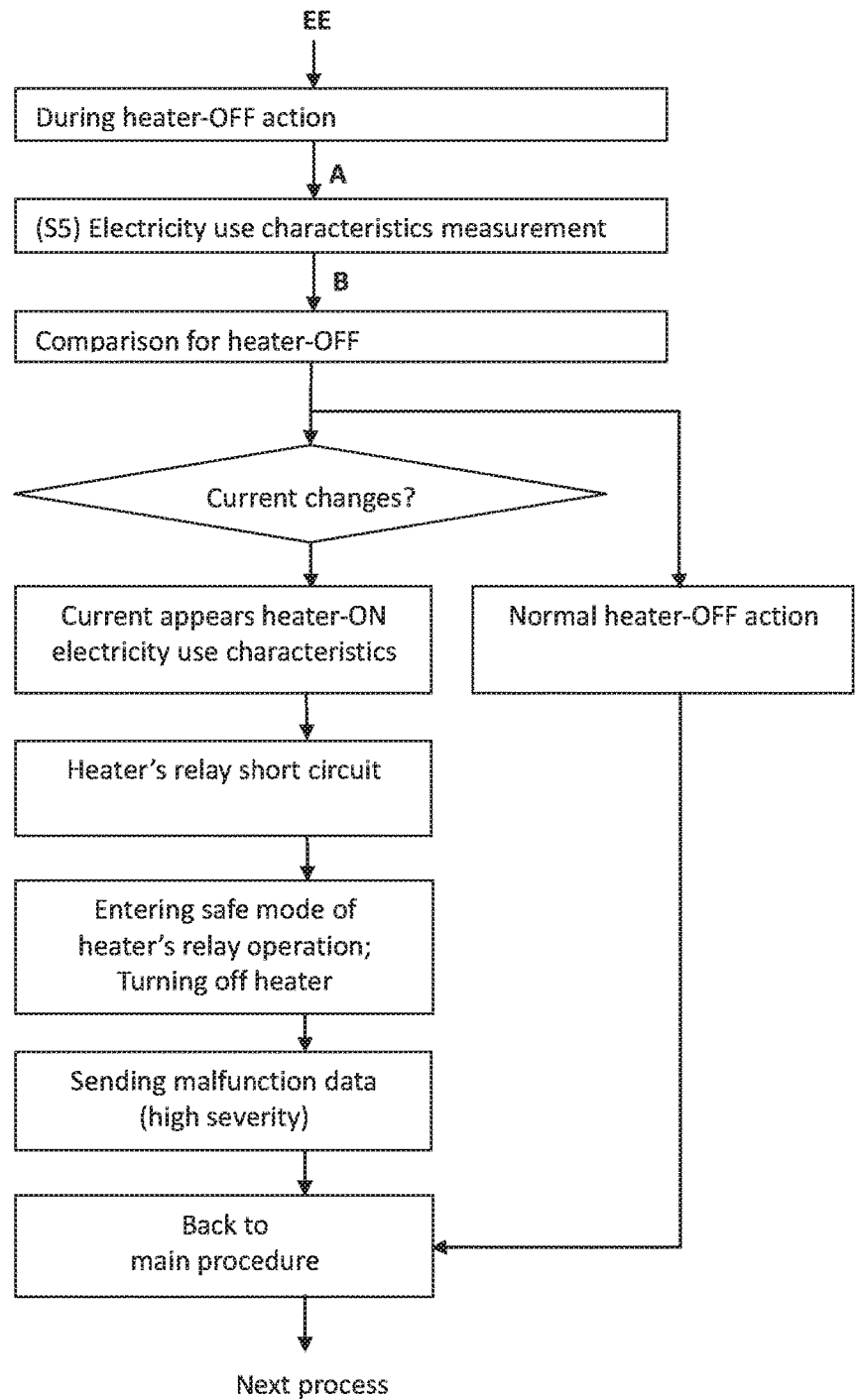
FIG. 12 shows a flowchart of the continuous monitor and analysis procedure (example of heater-off) according to the present invention.
Figure 13:
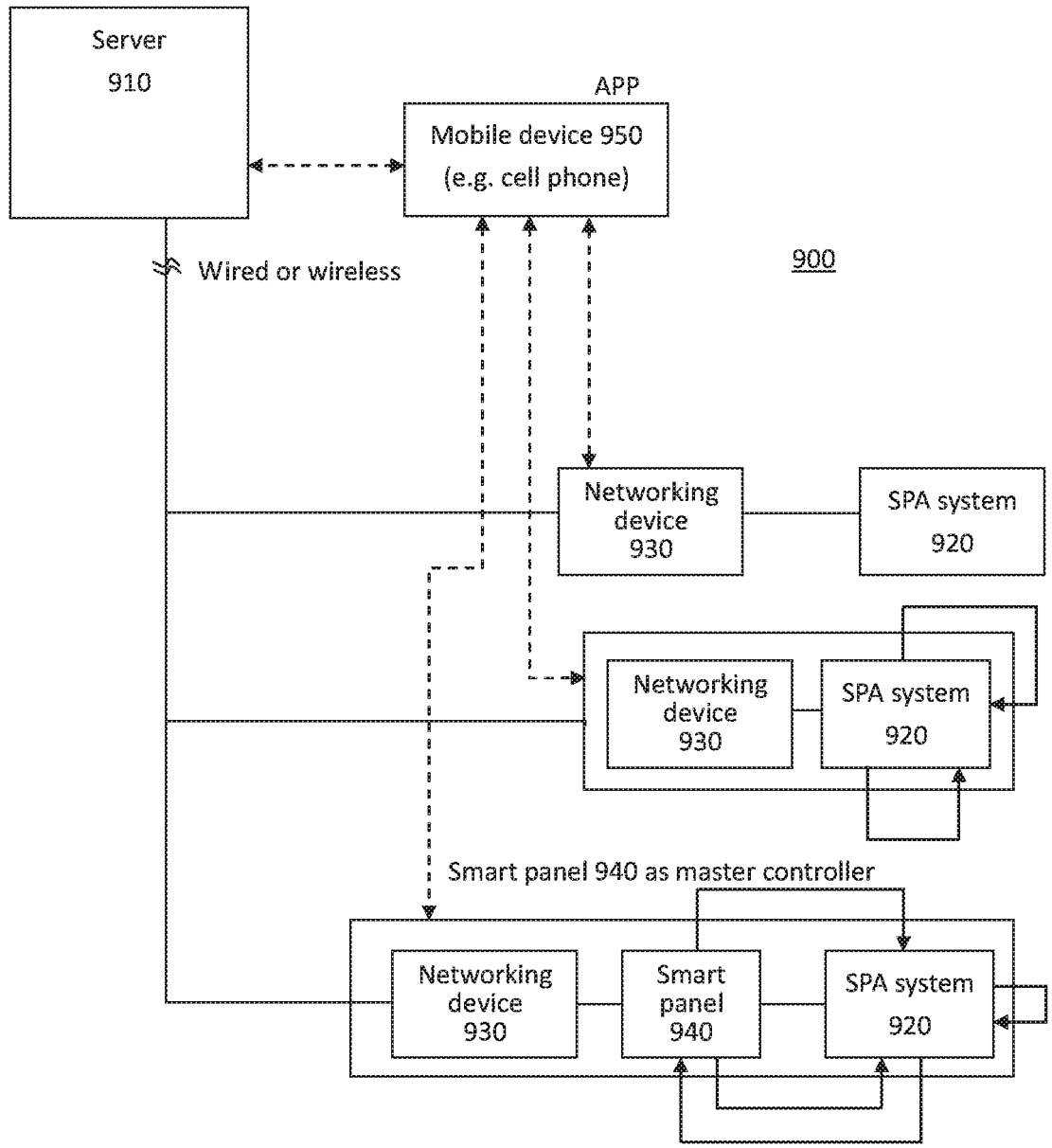
FIG. 13 shows a prior art IoT system.
Figure 14:
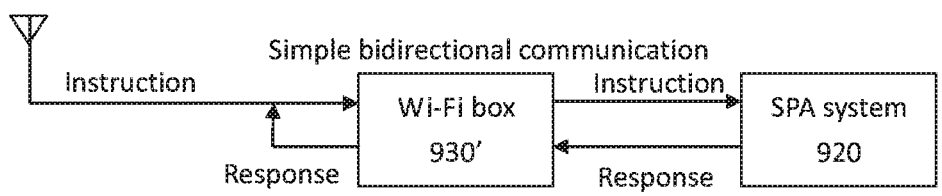
FIG. 14 shows a prior art Wi-Fi box serving as the networking device of FIG. 13.

FIG. 12 shows a flowchart of the continuous monitor and analysis procedure (example of heater-OFF) according to the present invention.

The continuous monitor and analysis procedure is designed for a heater-OFF state, because we should ensure that the heater is completely turned off and continuously turned off.

Observing a label "EE" in FIG. 4 and FIG. 12, the continuous monitor and analysis procedure for heater-OFF in step S65 in FIG. 4 may start from "EE" in FIG. 12.

Accordingly, the heater-OFF analysis of the continuous monitor and analysis procedure includes following steps:

(i) performing the electricity use characteristics measurement for a heater during a heater-OFF action;

(ii) comparing measured electricity use characteristics of the heater with the data list; and (iii) entering a safe mode of a heater's relay operation, turning off the heater and sending malfunction data to the RDS, the CMS and/or the APP, if it confirms a heater's relay short circuit results in heater-ON electricity use characteristics.

In conclusion, the present invention realizes an agent analyzer, which is capable of control instruction conversion and current measurement and analysis. The agent analyzer may be realized in form of a wired or wireless networking device. In addition to providing communication via a wired or wireless network, the agent analyzer is further designed to intercept (buffer) various remote control instructions (from a remote diagnosis system, for example), and convert them into extended control instructions compatible for different models of apparatuses (terminal product systems). In this way, the remote diagnosis system may control the apparatus by various control instruction to perform operation, diagnosis, maintenance or other application on the apparatuses.

Although the present invention has been explained in relation to its preferred embodiment, it is to be understood that many other possible modifications and variations can be made without departing from the spirit and scope of the invention as hereinafter claimed.

What is claimed is:

1. An agent analyzer, comprising:
   an instruction buffer used to receive a control instruction via a wireless or wired communication module and temporarily store the control instruction;
   a data list set including data lists;
   an extended control generator connected to a terminal product system, the instruction buffer, and the data list set, the extended control generator including an extended control process module and an electricity use characteristics analysis module, and configured to generate at least one extended control instruction based on at least one electricity use characteristic of the terminal product system, at least one control instruction from the instruction buffer and data in the data list set; and
   an instruction transmitter connected to the extended control generator, and used to transmit the extended control instruction from the extended control generator to the terminal product system;
   wherein the agent analyzer is designed to insert an additional time period after receiving the control instruction;
   the extended control generator performs a extended control process via the extended control process module and an electricity use characteristics analysis via the electricity use characteristics analysis module to generate an extended control instruction;
   the instruction transmitter transmits the extended control instruction to the terminal product system; and
   the additional time period exists between receipt of the control instruction and transmission of the extended control instruction.

2. The agent analyzer as claimed in claim 1, wherein the terminal product system is supplied with a power source and provided with a current sensor to sense the power source.

3. The agent analyzer as claimed in claim 2, wherein the extended control generator is connected to the current sensor to measure and analyze a current.

4. The agent analyzer as claimed in claim 2, wherein the extended control generator is connected to a power source node of the terminal product system to measure and analyze a voltage.

5. The agent analyzer as claimed in claim 1, further comprising a panel used to enter the control instruction locally.

6. The agent analyzer as claimed in claim 1, wherein the data list set includes a model list, an instruction list, and a standard electricity use list.

7. The agent analyzer as claimed in claim 6, wherein the standard electricity use list includes weighted basic electricity use data.

8. The agent analyzer as claimed in claim 6, wherein the data list set includes common electricity use characteristics, single load electricity use characteristics and/or complex electricity use characteristics with respect to a product controller, a circulation motor, a heater, a first motor, and/or a second motor of the terminal product system.

9. The agent analyzer as claimed in claim 8, wherein the single load electricity use characteristics and the complex electricity use characteristics are derived by comparing a measured total present electricity use of the terminal product system with the basic electricity use characteristics.

10. The agent analyzer as claimed in claim 1, wherein the extended control generator performs an electricity use characteristics analysis to determine whether there is a malfunction of a load or a relay of the load of the terminal product system.

11. The agent analyzer as claimed in claim 1, wherein the extended control generator has a measurement function for measuring the electricity use or consumption of at least one load in the terminal product system, the measurement function using Fourier transform to obtain current values of at least eight non-zero harmonic components, and then calculate RMS value of the at least eight values, which is the amount of electricity consumption.

* * * * *